June 29, 1954   G. GRECO   2,682,505
ELECTRODE ASSEMBLY FOR BIPOLAR ELECTROLYZERS
Filed Oct. 31, 1950
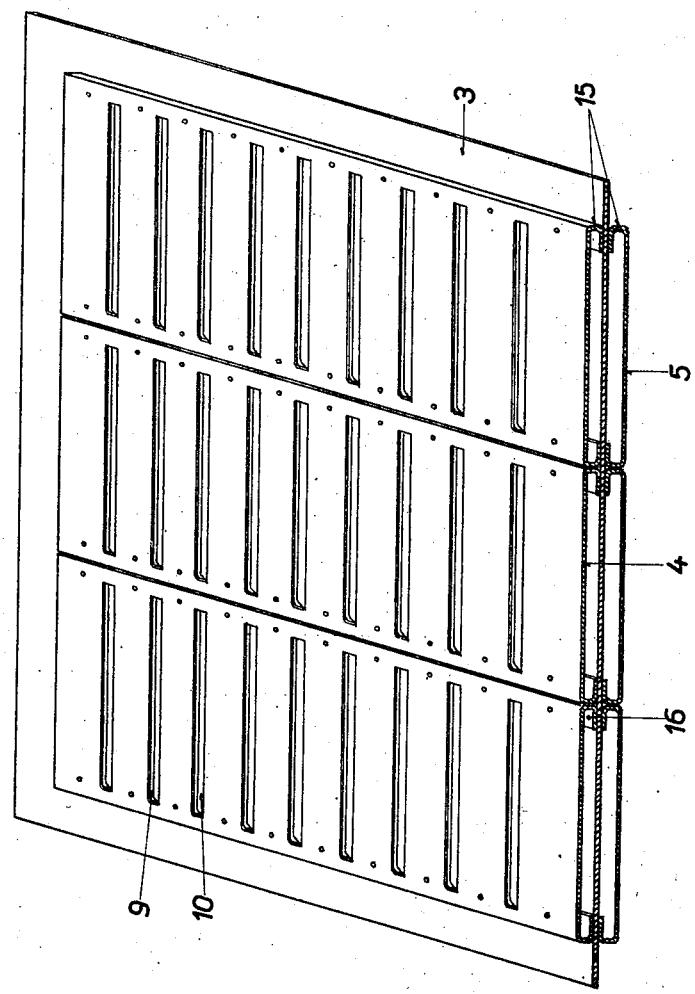
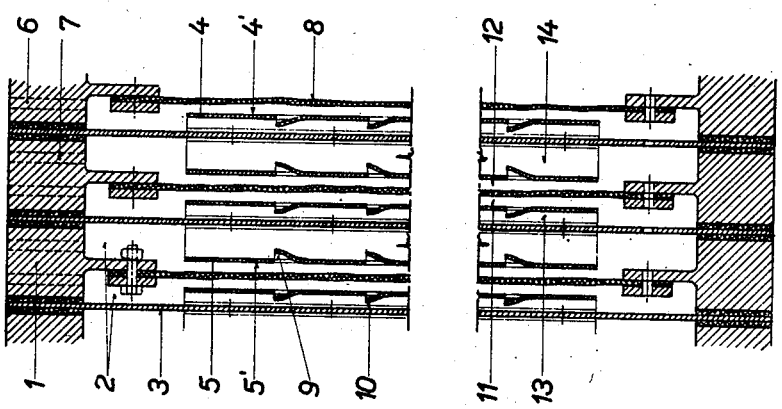
Guido Greco
By Knight Bros
attorneys

Patented June 29, 1954

2,682,505

UNITED STATES PATENT OFFICE 2,682,505

ELECTRODE ASSEMBLY FOR BIPOLAR ELECTROLYZERS

Guido Greco, Milan, Italy, assignor to Montecatini Società Generale per l'Industria Mineraria e Chimica Anonima, a corporation of Italy Application October 31, 1950, Serial No. 193,058

Claims priority, application Italy November 3, 1949

2 Claims. (Cl. 204—284)

The present invention relates to electrode assemblies of bipolar electrolyzers for the production of hydrogen, in particular to assemblies constituted by three-plate systems. In such systems the two outer plates are apertured and form the electrodes proper on which the gases (oxygen and hydrogen) develop. One of these electrode plates constitutes the positive pole of one cell and the other the negative pole of the contiguous cell of the electrolyzer. The central plate has only the function of confining the cells and of supporting the outer plates.

The three-plate electrode system has the purpose of minimizing the distance between the poles of the cell for reducing the ohmic resistance of the liquid between the two electrodes and, therefore, the voltage to be applied, thus reducing the consumption of electric energy for a given quantity of hydrogen and oxygen produced. The apertures in the electrode plates permit the developed gases to pass from the interelectrode space to the rear spaces. This reduces the concentration of the gases in the liquid between the electrodes and, therefore, the ohmic resistance of the circuit.

However, the known constructions involve various deficiencies. It is difficult to obtain perfect parallelism between the electrode surfaces facing each other. Such a parallelism is an important requirement because of the reduced distance between the electrodes. For instance, this distance is in the order of 10 mm. for electrodes of 2 × 2 m. area so that even modest tolerances may cause large percentage variation of the electric properties. The connecting means used heretofore increase the ohmic resistance of the electrodes and are not safe if bolts are used. The holes provided in the electrodes are of low efficiency as to gas removal, reduce the useful surface of the electrodes and cause irregularity in gas removal.

It is the object of the present invention to provide an improved structure of electrode assemblies which avoids some or all of these deficiencies and also reduces the manufacturing cost.

The three-plate electrode structure according to the present invention has its two electrode plates provided with narrow cut-out louver portions extending parallel to one another in the horizontal direction. These louver portions are contiguous along their respective bottoms with the rest of the electrode plate and project upwardly away therefrom in the direction of the gas escape. The louver portions are of streamlined shape so as to offer minimum resistance against passage of the gases and their respective slot openings lie in horizontal planes and hence do not appreciably reduce the active surface of the electrode. According to another feature of the invention, each electrode is composed of a plurality of individually louvered panels which have bent-in vertical edges so as to form a flange parallel to the panel plane, the panel being fastened to the central plate by spot-welding along the vertical flanges. It has been found that such a louvered design permits obtaining perfectly plane electrode surfaces and, together with the panel structure of the assembly, greatly facilitates securing a uniform parallelism of the plate surfaces.

An embodiment of the present invention is illustrated by way of example in the accompanying drawing, wherein:

Fig. 1 represents a vertical longitudinal section of part of an electrolyzer; and Fig. 2 represents an axonometric view of a system of electrodic plates according to the invention, with three-panelled lateral electrodes.

The electrolyzer shown in Fig. 1 has a number of metal frames 1 whose thickness determines the volume of each cell 2.

Held between the frames 1 and insulated therefrom by interposed gaskets are plates 3 confining the cells and serving to support the lateral electrode plates 4 and 5 whose faces 4' and 5' constitute the positive and negative poles of two contiguous cells. Each frame 1 has outlet conduits 6 and 7 for the gases (oxygen and hydrogen) developing at the two electrodes of each cell. Each frame 1 further carries a diaphragm 8 (for example of asbestos cloth) which separates the gases inside the individual cells 2.

Each electrode plate 4 and 5 has upwardly open, horizontal slots 9 obtained by cutting and bending respective louver portion out of the electrode material. The slots 9 form outlets for the gases which develop on the faces 4' and 5' of the electrodes and escape from the narrow interelectrodic spaces 11 and 12 towards the rear spaces 13 and 14 respectively. This gas flow encounters minimum resistance because the shape of the louver portions is substantially along the outgoing fluid streamlines. As apparent from the drawing, the slots lie in substantially horizontal planes so that the slots do not involve any appreciable reduction of the useful surface of the electrodes.

According to Fig. 2, each electrode is composed of three horizontally aligned panels, each panel having the above-mentioned louver portions 10 and slots 9. Each panel has its vertical edge portions 15 bent into C-shape. The resulting flanges 16 are fastened to the central supporting plate 3 by spotwelding. This combines the three plates to a structural unit which is reinforced by the flanged edges and by the louvers of the panels and, therefore, has great stiffness in all directions. This rigidity secures the desired equidistance and parallelism between the opposed active surfaces.

An electrolyzer with an electrode structure according to the present invention offers the following advantages over conventional electrolyzers:

(1) The interelectrode distance is uniform over almost the entire surfaces.

(2) The regularity of gas escape is improved.

(3) The flow resistance for the gas escape is a minimum.

(4) The ports for the gas escape may be sufficiently large without appreciably reducing the active surface of the electrodes.

(5) The ohmic resistance of the electrodes is reduced to a minimum due to improved electric contact and the increased conductive cross section obtained by spot-welding the panel flanges to the central plate.

(6) The distribution of the current is made more uniform due to the perfectly plane and parallel working surfaces of the louvered assembly.

(7) The rigidity and sturdiness of the structure permit using thinner plates and consequently reducing the cost.

I claim:

1. An electrode assembly for bipolar electrolyzers, comprising a central supporting plate, electrode plates secured to said supporting plate and extending parallel at opposite sides respectively of said supporting plate, said electrode plates having narrow cut-out louver portions extending horizontally and parallel to one another over substantially the whole width of the electrode plates, each of said louver portions being contiguous along its bottom with the rest of the electrode plate and being upwardly bent away therefrom toward said supporting plate to form a slot opening in a substantially horizontal plane, and means along the vertical sides of said electrode plates for securing said electrode plates in spaced parallel relation to said supporting plate.

2. An electrode assembly for bipolar electrolyzers, comprising a central supporting plate, two electrodes extending parallel to said plate at opposite sides respectively thereof, each of said electrodes comprising a plurality of horizontally aligned panels, each of said panels having narrow cut-out louver portions extending horizontally and parallel to one another over substantially the whole width of the panels, each of said louver portions being contiguous along its bottom with the rest of the panel and having a streamlined shape upwardly receding from the plane of the panel toward said plate, and each panel having vertical edge portions re-entrantly bent so as to form a vertical flange parallel to the panel plane, said flanges being in face-to-face contact with said plate and being welded thereto.

References Cited in the file of this patent

UNITED STATES PATENTS

| Number | Name | Date |
|---|---|---|
| 1,788,904 | Zdanski | Jan. 13, 1931 |

FOREIGN PATENTS

| Number | Country | Date |
|---|---|---|
| 503,002 | Great Britain | Mar. 29, 1939 |
| 811,238 | France | Jan. 14, 1937 |
| 850,671 | France | Sept. 18, 1939 |
| 453,750 | Germany | Dec. 14, 1927 |